(12) United States Patent
Vuong et al.

(10) Patent No.: US 8,593,404 B2
(45) Date of Patent: Nov. 26, 2013

(54) REDUCED KEY ARRANGEMENT FOR A MOBILE COMMUNICATION DEVICE

(75) Inventors: Thanh V. Vuong, Kitchener (CA); Jason T. Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 1447 days.

(21) Appl. No.: 11/845,136

(22) Filed: Aug. 27, 2007

(65) Prior Publication Data
US 2009/0058809 A1    Mar. 5, 2009

(51) Int. Cl.
*G06F 3/02* (2006.01)
*G09G 5/00* (2006.01)

(52) U.S. Cl.
USPC ........................... 345/168; 345/169; 345/172

(58) Field of Classification Search
USPC .................. 345/156, 168, 169, 172
See application file for complete search history.

(56) References Cited

U.S. PATENT DOCUMENTS

| | | | |
|---|---|---|---|
| 3,967,273 A | 6/1976 | Knowlton | |
| 4,449,839 A | 5/1984 | Bleuer | |
| 5,288,158 A | 2/1994 | Matias | |
| 5,841,374 A | 11/1998 | Abraham | |
| 5,953,541 A | 9/1999 | King et al. | |
| 6,011,554 A | 1/2000 | King et al. | |
| 6,102,594 A | 8/2000 | Strom | |
| 6,103,979 A | 8/2000 | Motoyama et al. | |
| 6,157,323 A | 12/2000 | Tso et al. | |
| 6,286,064 B1 | 9/2001 | King et al. | |
| 6,295,052 B1 | 9/2001 | Kato et al. | |
| 6,307,548 B1 | 10/2001 | Flinchem et al. | |
| 6,356,258 B1 | 3/2002 | Kato et al. | |
| 6,507,336 B1 | 1/2003 | Lunsford | |
| 7,088,340 B2 * | 8/2006 | Kato | 345/168 |
| 2001/0048378 A1 | 12/2001 | Horie | |
| 2003/0193478 A1 | 10/2003 | Ng et al. | |
| 2005/0231486 A1* | 10/2005 | Wiggeshoff | 345/168 |
| 2007/0188472 A1* | 8/2007 | Ghassabian | 345/169 |

FOREIGN PATENT DOCUMENTS

| | | |
|---|---|---|
| EP | 0882259 A1 | 8/1997 |
| EP | 1906297 A1 | 4/2008 |
| WO | 01/96997 A1 | 12/2001 |

(Continued)

OTHER PUBLICATIONS

EPO: Communication pursuant to Article 94(3) EPC dated Apr. 20, 2009 for European patent application No. 07115036.1-1245 (6 pages).

(Continued)

*Primary Examiner* — Duc Dinh
(74) *Attorney, Agent, or Firm* — Jones Day

(57) ABSTRACT

A keyboard for a mobile communication device includes a first set of alphanumeric keys that is arranged in a two column by three row array. In a first example, the key arrangement includes vowels and consonants in the two by three array, with function keys positioned in a row that is different from the first set of keys. In another example, the key arrangement includes consonants in the first set of keys and vowels in a second set of keys, with the first set of keys including a two by three array of keys and the second set of keys being positioned in a row other than the rows of the two by three array of keys. The keys may be toggle keys. The characters may be input via multi-tapping the keys, word completion, and/or other known text entry techniques.

23 Claims, 11 Drawing Sheets

(56) References Cited

FOREIGN PATENT DOCUMENTS

| WO | 03/041047 A1 | 5/2003 |
|---|---|---|
| WO | 03/085505 A1 | 10/2003 |
| WO | 2005/122401 A2 | 12/2005 |

OTHER PUBLICATIONS

TenGO Keyboard—VGA/WM5 SUPPORT! on PocketGear.com by Xrgomics Pte Ltd [retrieved Apr. 10, 2007] http://www.pocketgear.com/software_detail.asp?id=10111 (7 pgs).

TenGO, 4100 TenGO (tm) Keyboard for Model Audiovox PPC4100 [retrieved Apr. 10, 2007] http://www.tengo.net/4100/tengokeybd_sipintro.html (5 pgs).

The Fitaly One-Finger Keyboard [retrieved Jul. 2, 2004] http://www.fitaly.com/fitaly//fitaly.htm (19 pgs).

The Fitaly One-Finger Keyboard [retrieved Apr. 10, 2007] http://www.fitaly.com/fitaly/ofkey.htm (4 pgs).

Pocket PC Life, "TenGO Keyboard Reviewed" [retrieved Jul. 2, 2004] http://www.pocketpclife.co.uk/featureddetails.asp?article=446 (3 pgs).

Frequency of Use Information, Maltron Keyboards [retrieved Apr. 10, 2007] http://www.maltron.com/maltron-freq-info.html (2 pgs).

Frequency of Use—Modern, Maltron Keyboards [retrieved Apr. 10, 2007] http://www.maltron.com/words/characters-freq-modern.html (3 pgs).

Commonest Words—Modern, Top 100 Commonest Words English Modern Prose [retrieved Apr. 10, 2007] http://www.maltron.com/words/words-modern-commonest.html (5 pgs).

EPO: Communication and extended European search report dated Jan. 16, 2008 for European patent application No. 07115036.1-1245 (7 pages).

CIPO: Office Action, Application No. 2638671, Jan. 5, 2012 (2 pages).

CIPO: Office Action, Application No. 2638671, Mar. 14, 2011 (2 pages).

\* cited by examiner

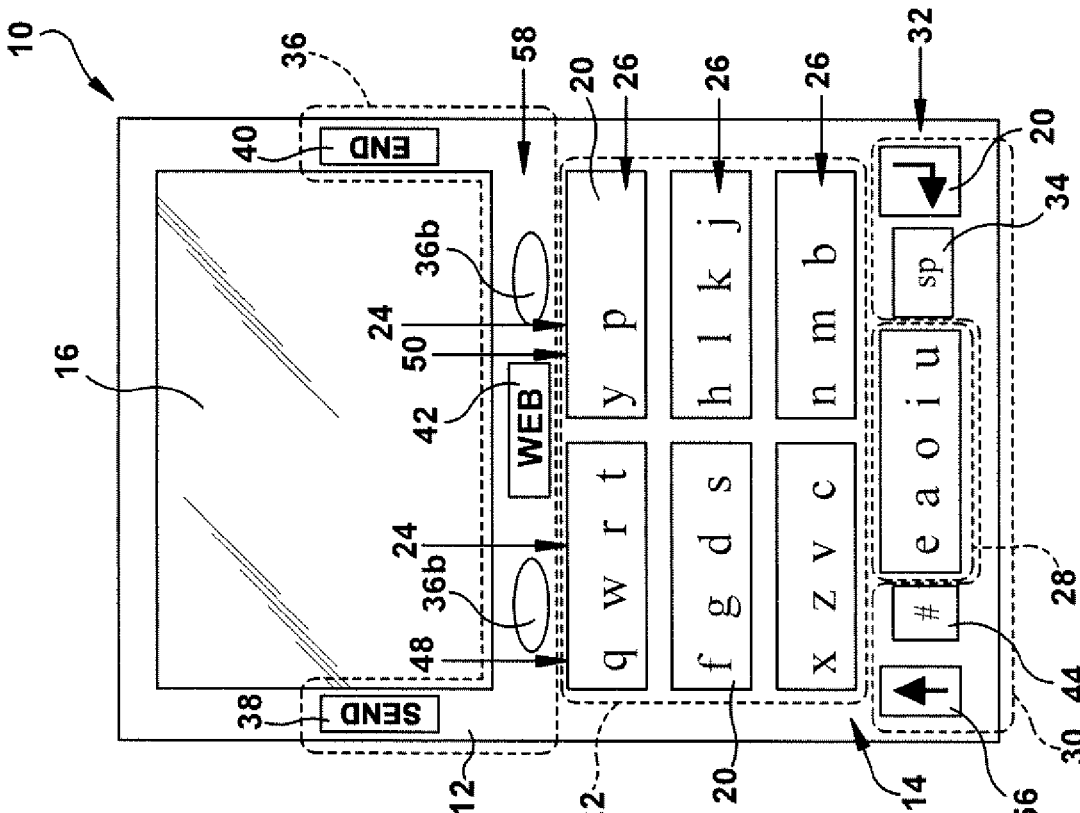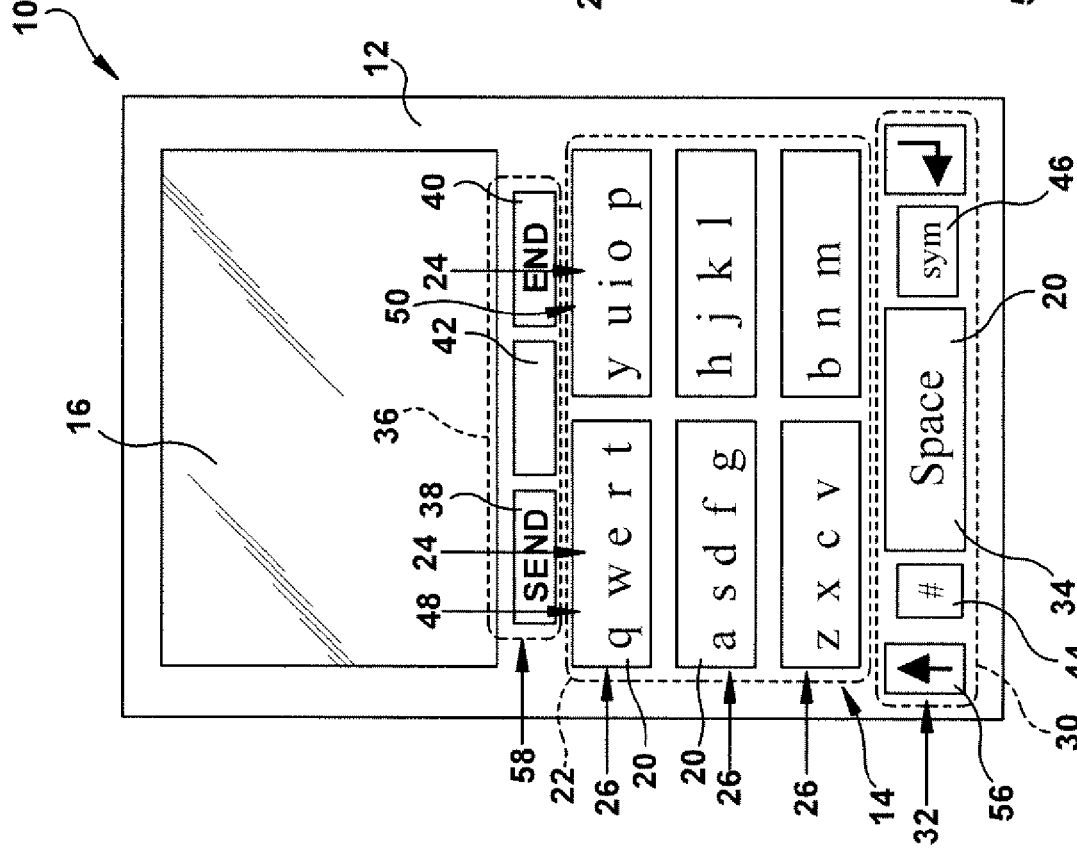

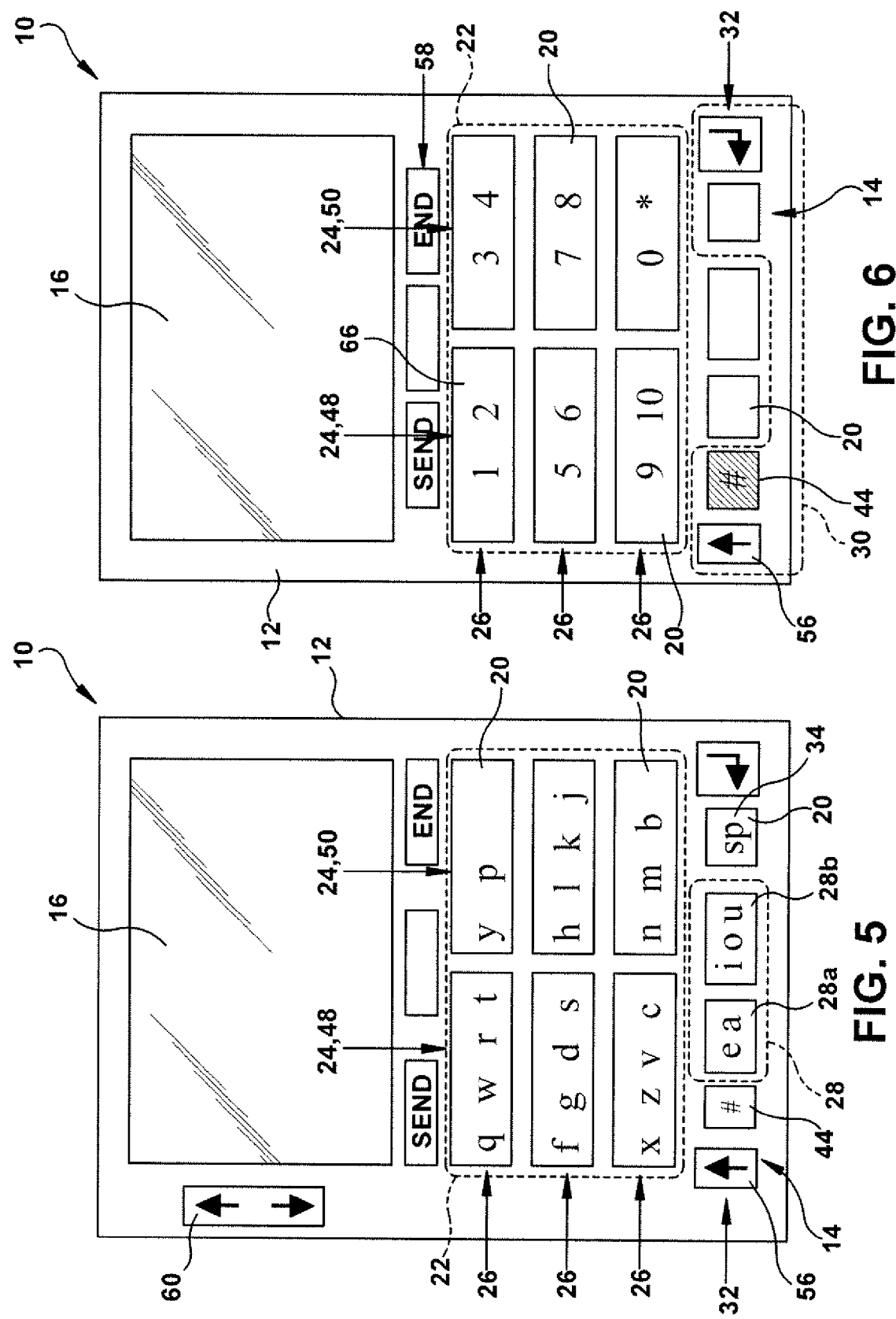

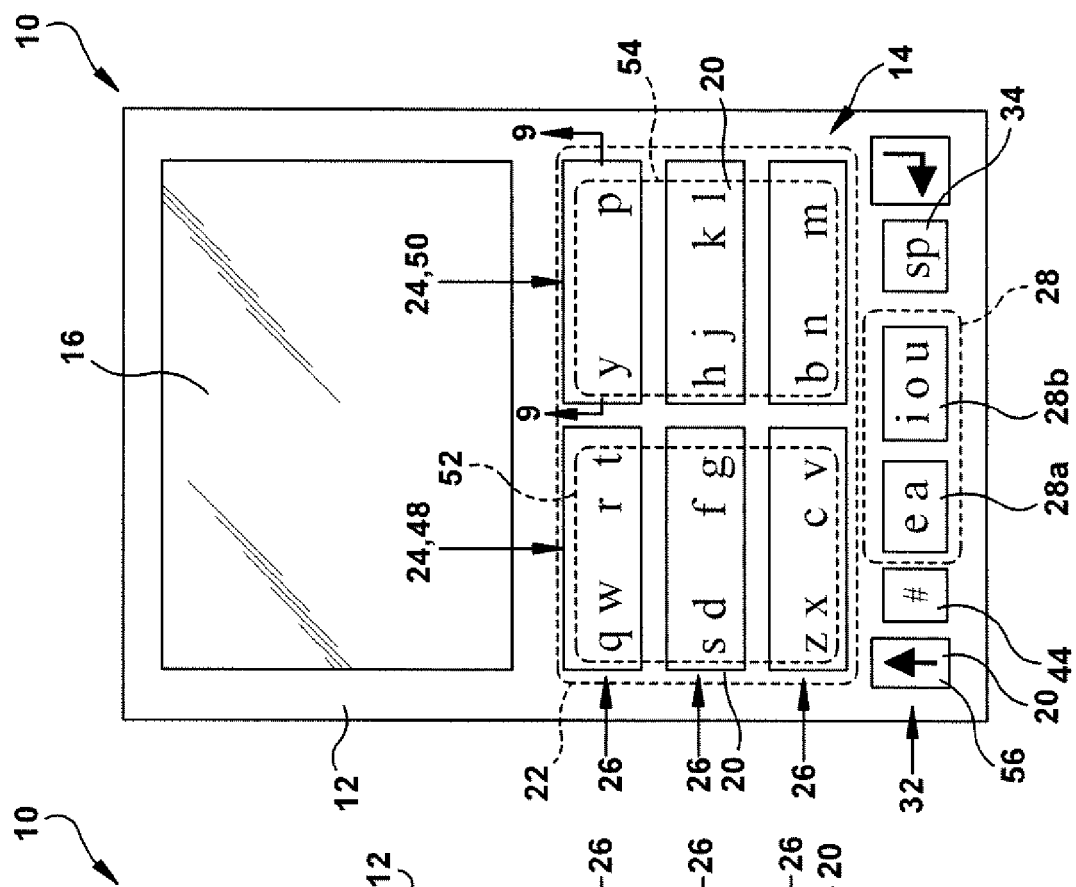
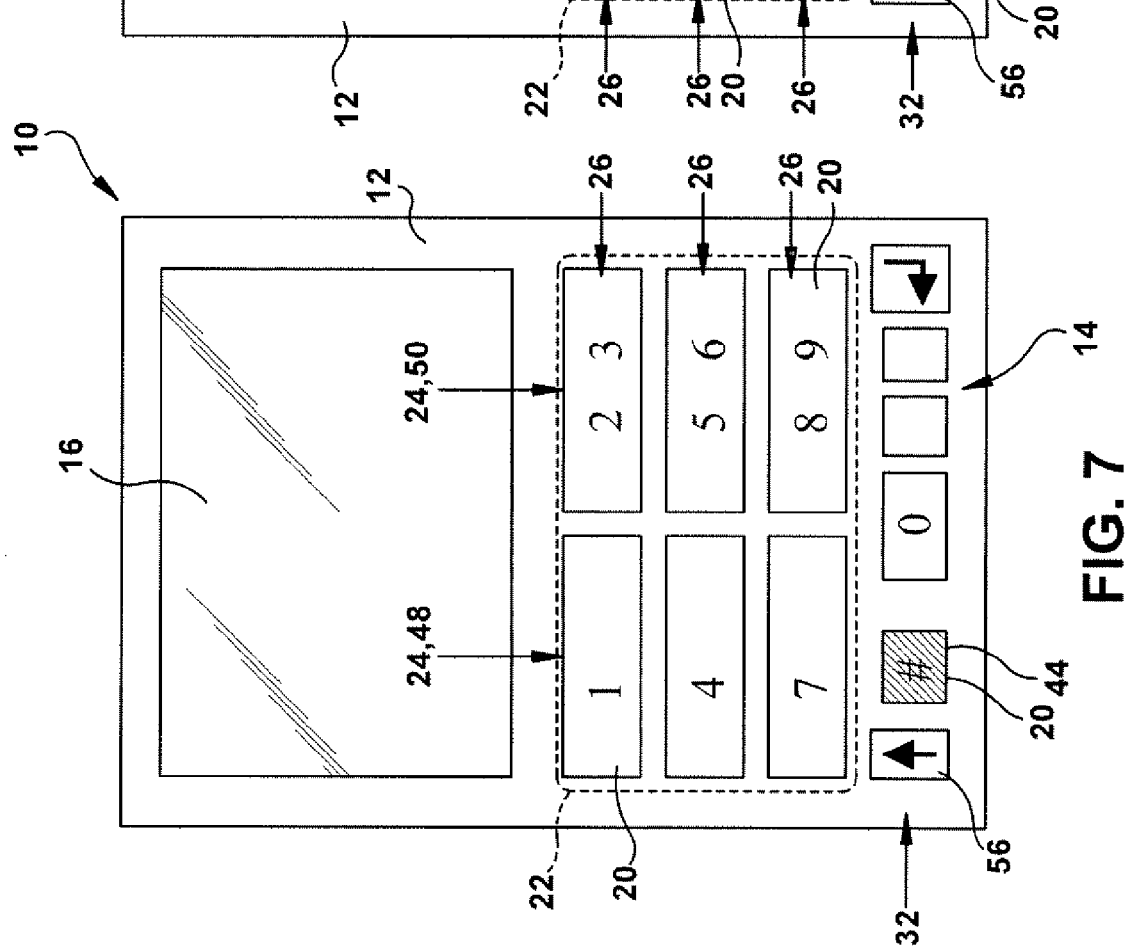
FIG. 8
FIG. 7

| Lower | Upper | Lower % | Upper % | Total % |
|---|---|---|---|---|
| Space | | 17.460% | | 17.460% |
| e | E | 9.781% | 0.053% | 9.834% |
| t | T | 6.819% | 0.285% | 7.104% |
| a | A | 6.207% | 0.180% | 6.387% |
| o | O | 5.686% | 0.058% | 5.744% |
| n | N | 5.304% | 0.077% | 5.380% |
| h | H | 4.898% | 0.205% | 5.103% |
| i | I | 4.761% | 0.298% | 5.059% |
| s | S | 4.630% | 0.212% | 4.842% |
| r | R | 4.472% | 0.057% | 4.529% |
| d | D | 3.694% | 0.064% | 3.758% |
| l | L | 3.251% | 0.053% | 3.303% |
| u | U | 2.212% | 0.016% | 2.228% |
| c | C | 1.772% | 0.099% | 1.871% |
| m | M | 1.735% | 0.127% | 1.862% |
| w | W | 1.687% | 0.103% | 1.791% |
| g | G | 1.632% | 0.066% | 1.698% |
| f | F | 1.541% | 0.065% | 1.606% |
| y | Y | 1.418% | 0.058% | 1.476% |
| p | P | 1.241% | 0.051% | 1.292% |
| b | B | 1.107% | 0.140% | 1.247% |
| , | < | 1.211% | 0.001% | 1.212% |
| . | > | 1.192% | 0.001% | 1.193% |
| k | K | 0.781% | 0.044% | 0.825% |
| 2 | " | 0.005% | 0.753% | 0.757% |

| Lower | Upper | Lower % | Upper % | Total % |
|---|---|---|---|---|
| v | V | 0.681% | 0.020% | 0.701% |
| Enter | | 0.446% | | 0.446% |
| ' | @ | 0.235% | 0.000% | 0.235% |
| j | J | 0.093% | 0.024% | 0.117% |
| / | ? | 0.001% | 0.109% | 0.110% |
| z | Z | 0.105% | 0.004% | 0.108% |
| x | X | 0.102% | 0.001% | 0.103% |
| - | _ | 0.062% | 0.028% | 0.089% |
| q | Q | 0.058% | 0.004% | 0.062% |
| 1 | ! | 0.005% | 0.052% | 0.057% |
| ; | : | 0.043% | 0.009% | 0.053% |
| 0 | ) | 0.005% | 0.005% | 0.010% |
| 9 | ( | 0.001% | 0.005% | 0.007% |
| 8 | * | 0.001% | 0.006% | 0.007% |
| 5 | % | 0.003% | 0.000% | 0.003% |
| 3 | £ | 0.003% | 0.000% | 0.003% |
| 4 | $ | 0.002% | 0.000% | 0.002% |
| 7 | & | 0.001% | 0.000% | 0.001% |
| 6 | ¥ | 0.001% | 0.000% | 0.001% |
| # | + | 0.000% | 0.000% | 0.000% |
| = | ; | 0.000% | 0.000% | 0.000% |
| ] | } | 0.000% | 0.000% | 0.000% |
| [ | { | 0.000% | 0.000% | 0.000% |
| \ | \| | 0.000% | 0.000% | 0.000% |
| ` | ~ | 0.000% | 0.000% | 0.000% |

FIG. 14

REDUCED KEY ARRANGEMENT FOR A MOBILE COMMUNICATION DEVICE

FIELD

This technology relates to a reduced keyboard arrangement for a mobile communication device. In particular, the technology concerns a key arrangement where alphanumeric characters are arranged in a 2 column by 3 row grid.

BACKGROUND

Reduced keyboard designs are known. Most reduced keyboard designs utilize a grid of keys arranged in a plurality of rows and column. Current reduced physical keyboards, such as that utilized on the Blackberry®, by Research in Motion Ltd., use a 5 column by 5 row array for alphanumeric, function, and symbol entry of characters into the device. Another reduced keyboard, called the Tengo keyboard, uses a 4 column by 5 row array of keys to represent alphanumeric characters, symbols, and functions on a non-physical keyboard, where a touch screen and stylus are used for character entry. Smaller handheld communication devices are sought after by consumers and it is desirable to implement smaller keyboard designs in order to allow the form factor of mobile devices to be made smaller.

BRIEF DESCRIPTION OF THE DRAWING FIGURES

FIG. 1 is a front plan schematic of a handheld communication device incorporating an example reduced keyboard;

FIG. 2 is a front plan schematic of a handheld communication device incorporating a second example reduced keyboard;

FIG. 5 is a front plan schematic of a handheld communication device incorporating a fifth example keyboard;

FIG. 6 is a front plan schematic of a handheld communication device similar to that shown in FIG. 3;

FIG. 7 is a front plan schematic of a handheld communication device incorporating a sixth example keyboard;

FIG. 8 is a front plan schematic of a handheld communication device incorporating a seventh example keyboard;

FIG. 14 is a list of frequency of use percentages, as derived from modern prose, copied from www.maltron.com;

DETAILED DESCRIPTION

Figure 3:
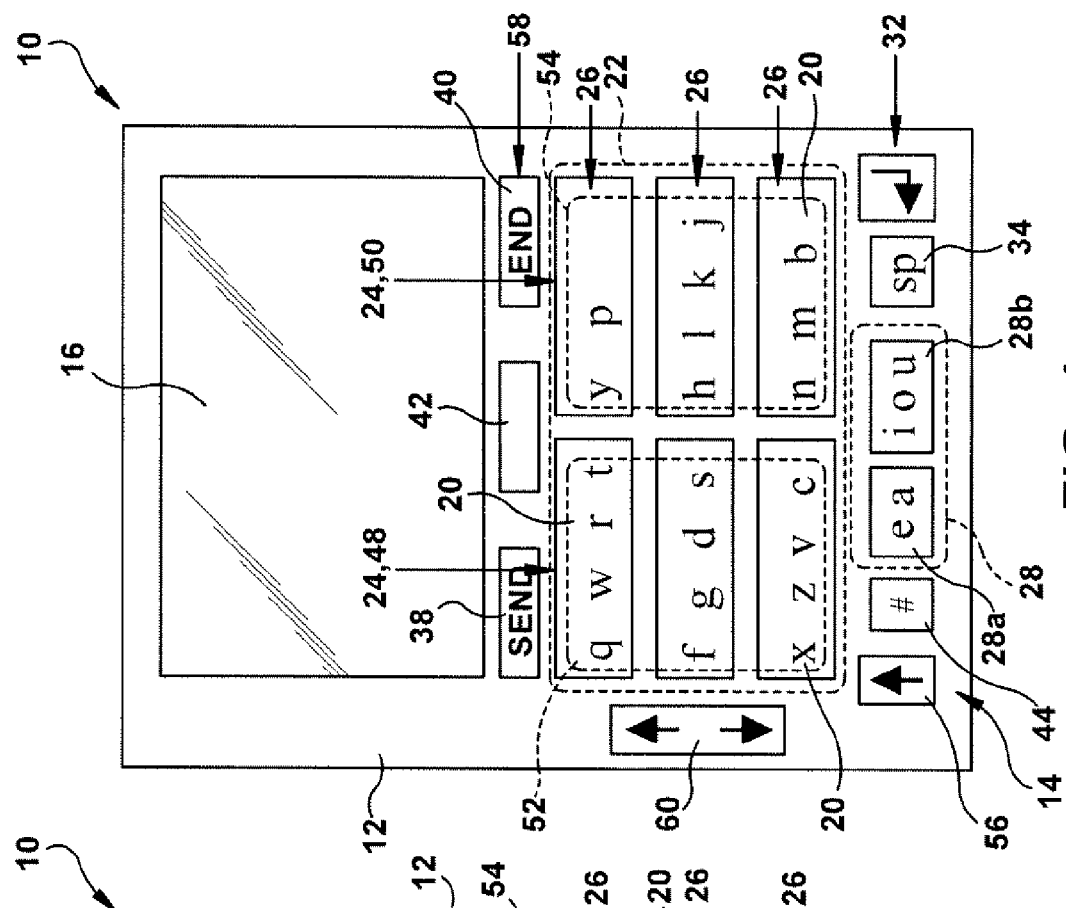
FIG. 3 is a front plan schematic of a handheld communication device incorporating a third example reduced keyboard.

According to the examples, a mobile communication device is shown and described that utilizes a keyboard having a reduced number of keys relative to a standard QWERTY keyboard, but that maintains the "feel" of a QWERTY key arrangement to aid in user familiarity. The example keyboards are designed for usage in a handheld communication device 10 (hereinafter "mobile device"), such as a mobile communication device, mobile station, cellular telephone, wireless personal digital assistant (PDA), personal information manager (PAY), two-way paging device, and others. Any type of mobile device 10 may be utilized with the example keyboards 14 and keys 20.

The example keyboard designs allow the user to enter different letters of the alphabet representing the QWERTY keyboard (26 keys) and number pad (10 keys) using only six keys arranged in a two column by three row array of keys. Each of the example keyboard designs depicted in FIGS. 1-12 are designed to provide a smaller form factor on a mobile device, while maintaining larger key sizes, making it easier for a user to use the keyboard and press the keys of the keyboard. As discussed in the background section, form factors for mobile devices have become smaller, to the point where key sizes have also become very small. Smaller keys are harder to activate by a user since the user's finger, or thumb, is often larger than the key itself The example keyboards of FIGS. 1-12 are designed to improve the quality and enhance the reliability of typing on a compact typing keyboard 14, which in turn improves the overall user experience while typing on tightly space keyboards.

Figure 17:
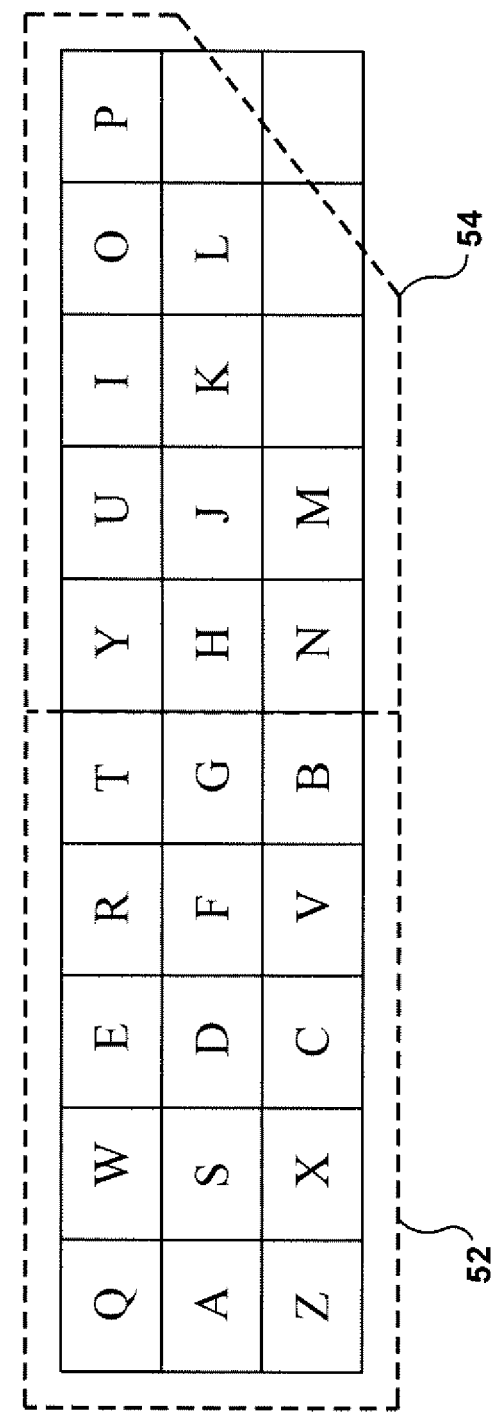
FIG. 17 is a schematic view of a traditional full-size QWERTY keyboard, as known in the prior art, showing keys associated with the left hand and right hand during normal typing.

FIG. 17 shows a prior art full-size QWERTY keyboard. The example keyboard utilize the QWERTY keyboard, but in a reduced format. In the full-size keyboard of FIG. 17, the left side keys 52 are keys typically associated with a left hand of a user during typing and the right side keys 54 are keys that are typically associated with the right hand of a user during typing. Left side or left hand keys and right side or right hand keys are referred to herein frequently. Reference should be made to FIG. 17 to understand that is meant by left side or left hand keys and right side or right hand keys.

The example keyboards are particularly useful in compact thumb typing mobile devices—those well suited for typing only with the user's thumbs. In mobile devices 10 of this type, the mobile device 10 is typically held in the palms of two hands while the user types with both thumbs on the keyboard 14. The present example key designs make the selection of a key 20 on the example keyboards 14 easier and more reliable due to the larger key sizes when compared with other similarly sized keyboards. As a result, unintended pressing of keys is avoided. As used herein, the term finger is defined as including any of the four fingers and thumb of the hand. The keys 20 may be selected by one of the four fingers or by the thumb. For simplicity, the term "finger" is used herein instead of referring to both the fingers and thumb.

Figure 15:
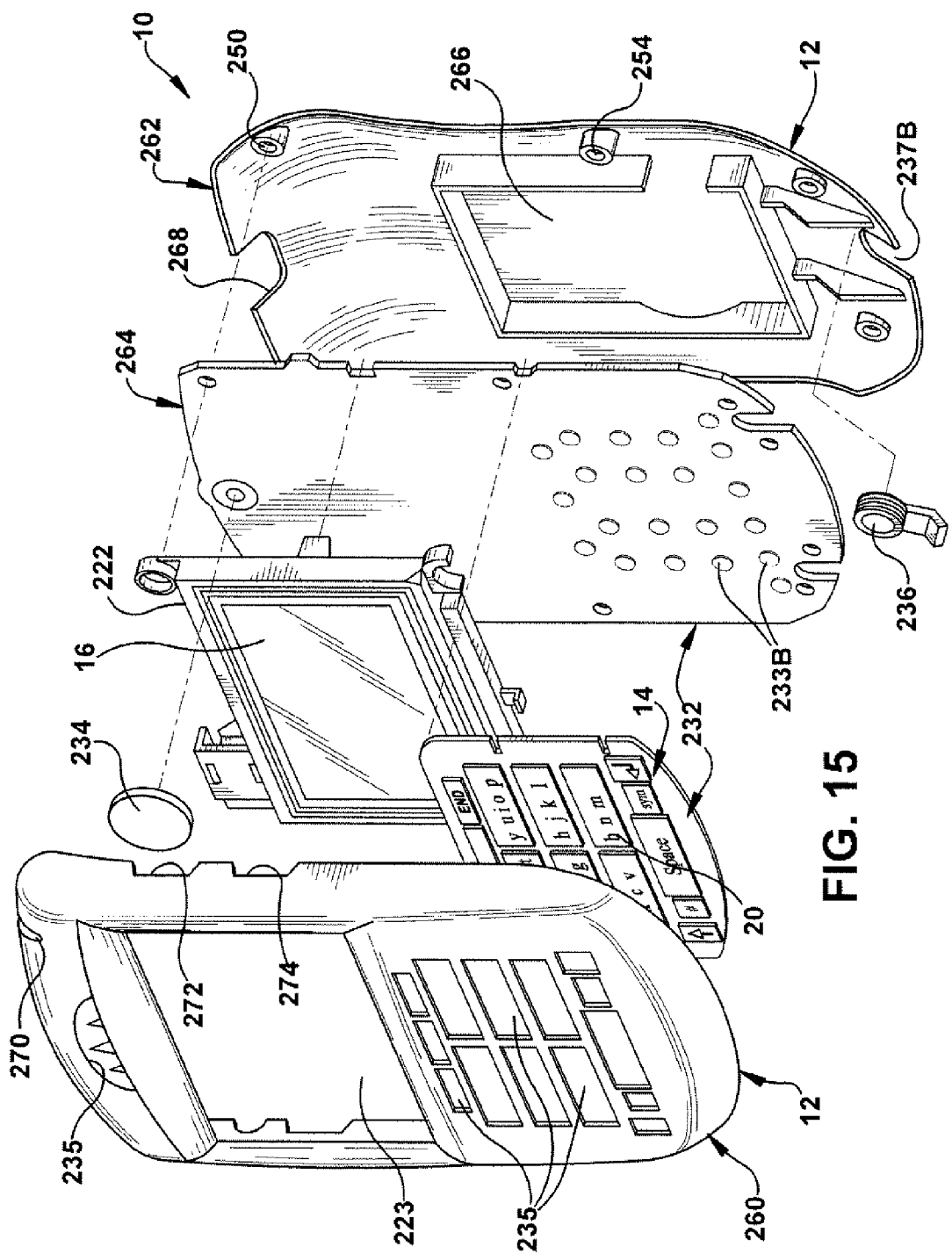
FIG. 15 is an exploded view of a mobile communication device incorporating an example keyboard like that of FIG. 1.

Referring to the Figures, FIG. 1 depicts a mobile device 10 having a housing 12, a display 16, and a keyboard 14. Peripheral inputs and outputs may also be utilized as shown in FIG. 15, such as a speaker port 235, a microphone 236, a thumbwheel 234, a roller ball (not shown), a camera (not shown), or any other known type of input or output device. This is true for all example mobile devices depicted herein. The housing 12 in FIGS. 1-12 is shown to be rectangular, but can be any shape. The mobile device 10 could be a clam shell-type of device, where one part pivots relative to another, a candy-bar type one piece device (as shown), or any other type of one or more part device that has movable or non-movable housing portions, the invention not being limited to the particular type of mobile device shown.

An example key arrangement 20 is depicted in connection with FIG. 1 in the form of a physical keyboard 14, which is a keyboard having physical keys 20 that must be pressed by a user. This is in contrast to a touch screen keyboard (not shown), where an area of a display is touched with a stylus. The physical keyboard 14 includes a plurality of keys 20. The keys 20 are broken into several different types of keys. A first set of keys 22 includes alphanumeric characters. Indicia associated with the alphabetic characters is presented on each key. In FIG. 1, characters and indicia associated with a standard QWERTY keyboard (such as that shown in FIG. 17) are presented on the keyboard 14. The first set of keys 22 includes a two column 24 by three row 26 array of keys 20 (hereinafter "2×3 array"), and all the alphanumeric characters are associated with the keys in this 2×3 array 22 of keys. The corresponding numeric values are presented in FIGS. 6 and 7.

In this example, all the alphabetic characters, including A-Z are presented on the 2×3 array of keys in the center of the keyboard 14. The vowels A, E, I, O, and U, which comprise a second set of keys 28, are mixed in with the consonants and presented as part of the first set of keys 22 in this example. A third set of keys 30 comprises function keys, such as a shift 56, #44, space 34, symbol 46, and return key. In FIG. 1, the keys 20 of the third set 30 are positioned in a row 32 that is below the 2×3 array of keys 22. The third set of keys 30 includes a space bar 34 that is centered below the 2×3 array of keys 22.

The example of FIG. 1 also includes a fourth set of keys 36 comprising communication keys, which include a send key 38 for initiating a telephone call, an end key 40 for ending a telephone call, and a convenience key 42. The convenience key 42 is shown positioned between the send 38 and end 40 keys, but could be located elsewhere or be absent. The convenience key 42 can be used for internet browsing, can be programmed by the user for any function desired, such as, for example, locking the keyboard, or can be any desired function or input. The send and end functions could alternatively be associated with a single key (not shown) that could be positioned above the 2×3 array 22, below the 2×3 array 22, or at any location on the housing 12 of the mobile device 10, as desired.

The example keyboard 14 includes a # key 44 that is used to switch the 2×3 array 22 of keys from alphabetic characters to numeric characters. Example 2×3 numeric arrays 22 are depicted in FIGS. 6 and 7. Indicia associated with the numeric characters is shown printed on the face of the individual keys 20. As shown in FIG. 1, alphabetic indicia is also printed on the face of the individual keys. The numeric indicia may be printed along side of, above, or below the alphabetic indicia on the face of the keys in any known manner. Alternatively, the numeric indicia could be printed on the housing 12 and the alphabetic indicia printed on the key, or vice versa. The numeric indicia could be a different color from or a different font than that of the alphabetic indicia. Other configurations for the indicia, as known by those of skill in the art, may be utilized, the example keyboard not being limited to the indicia shown. The user may toggle between the alphabetic characters and the numbers easily using the "#" key 44.

The example keyboard 14 shown in FIG. 1 includes a "sym" key 46 which, when pressed, will activate an onscreen symbol menu. The menu coordinates with the keys 20 within the keyboard 14 and serves as a map such that the user can select a symbol by pressing one of the keys 20 on the keyboard 14. This is a known technique for selecting symbols on small mobile devices.

FIG. 2 is similar to FIG. 1, but, in this example keyboard 14, the first set of keys 22, in the form of the 2×3 array, includes consonants only. The vowels are separated out onto a second set of keys 28, which comprises one or more keys. In FIG. 2, one key 28a is used for all the vowels. This key 28a is positioned below the 2×3 array of keys 22, but could be positioned at other locations on the mobile device 10. The indicia associated with the vowels may be arranged in any desired manner on the key 28a. As shown in FIG. 2, the vowels are arranged in the order of "e, a, o, i, u." A different order may be used, such as alphabetical, QWERTY order, or based upon frequency of use.

The vowel key 28a is positioned in a row 32 with the third set of function keys 30. The function keys 30 are similar to those shown and described in connection with FIG. 1. To the extent that the keys 30 are the same, their functions will not be described in any further detail. The fourth set of communication keys 36 in this example includes a send key 38 that is positioned on a left side of the display 16, an end key 40 that is positioned on a right side of the display 16, and a web browser key 42 that is positioned below the display 16. In addition, other function keys 36b that are oval-shaped are shown positioned beside the web browser key 42 above the 2×3 array of keys 22.

The consonants of the example keyboard 14 of FIG. 2 remain arranged in a format of a QWERTY key arrangement. Keys normally associated with typing by the left hand 52 are positioned in the first column 48 and keys normally associated with typing by the right hand 54 are positioned in the second column 50. The vowels are removed to a key 28a that is centered below the 2×3 array of keys 22. While the consonants maintain their left side/right side positions 52, 54, they are arranged on the keys based upon frequency of use according to modern prose such that multi-tapping results in the most common letters being selected before the less common letters.

In any of the above example keyboards 14, characters may be entered using a multi-tap technique. With the multi-tap technique, a user taps a chosen key a number of times in order to enter the selected character. For the keyboard 14 of FIG. 1, the user would tap the key 1 time for "Q" 2 times for "W," 3 times for "E,", 4 times for "R," and five times for "T." The same would follow for the remaining keys in other rows on the left side 52 of the keyboard 14. For keys on the right side 54 of the keyboard 14, the characters may be ordered so that the first tap selects the left most letter or the right most letter. The same is true for keys 20 on the left side 52. If desired, the first press could select the right most letter, "T" in row 1. Alternatively, the letters could be input based upon their frequency of usage, according to the percentages presented in FIG. 14. Even if the indicia for the characters is arranged in the QWERTY format, the actual letter obtained from striking or tapping a key could be based upon the frequency of usage according to modern prose, as shown in FIG. 14. The order of the characters on the face of the key 20 does not necessarily have to coincide with the order that characters are input when a key 20 is tapped.

The mobile device 10 has software 130A-130N and a processor 18 that implements the multi-tap inputs discussed above. The mobile device programming 130A-130N may use a time delay which is set at a predetermined interval, such as 1 to 5 seconds, so that when no key strokes are entered over the time interval, the programming assumes that the last key selected is the desired character or function. An alternative to the time delay would be the use of a "next" key, (not shown) where the user hits the "next" key after selecting a character or function.

In FIG. 2, the arrangement of indicia on the consonant keys are based upon the frequency of use percentages shown in FIG. 14, with the more frequently occurring keys requiring fewer taps and being positioned on the face of each key such that the higher frequency character is closer to the center than lower frequency characters. For example, for the first row, first column, entry of a "t" requires 1 tap, entry of an "r" requires 2 taps, entry of a "w" requires 3 taps, and entry of a "q" requires 4 taps. For the second row, first column, entry of an "s" requires 1 tap, entry of a "d" requires 2 taps, entry of a "g" requires 3 taps, and entry of an "f" requires 4 taps.

Vowels are also entered using multi-tap. Since the vowel key 28a is associated with five vowels, up to 5 key taps may be necessary to input a single character. Entry of an "e" requires 1 tap, entry of an "a" requires 2 taps, entry of an "o" requires 3 taps, entry of an "i" requires 4 taps, and entry of a "u" requires 5 taps.

FIG. 3 is similar to FIGS. 1 and 2, but depicts a keyboard 14 where the second set of keys 28 comprises two vowel keys 28a, 28b that are positioned adjacent each other in the bottom row 32. The vowel keys 28a, 28b are positioned in a row 32 with function keys from the third set of keys 30. The function keys 30 are similar to those discussed above in connection with FIG. 1. The first set of keys comprises a 2×3 array of consonants 22. The 2×3 array 22 includes a left side set of keys 52 and a right side set of keys 54 that are consistent with the QWERTY keyboard left and right side set of keys. The left side set of keys 52 are associated with consonants that are associated with the left hand of a user during typing on a QWERTY keyboard, shown also in FIG. 17. The right side set of keys 54 are associated with consonants that are typically associated with the right hand of a user during typing on a QWERTY keyboard, shown also in FIG. 17. Indicia associated with the consonants are arranged on the face of the keys 20. The shift 56 and space key 34 may be used to bring up a list of symbols, instead of using an independent symbol key 46.

In addition, the two vowel keys 28a, 28b include a left side vowel key 28a and a right side vowel key 28b. The vowels associated with the left side vowel key 28a are typically associated with the left hand during typing on a QWERTY keyboard while the vowels associated with the right side vowel key 28b are typically associated with the right hand during typing on a QWERTY keyboard. The vowels may be arranged in an order consistent with the QWERTY key arrangement, or may be arranged in order of frequency of use. Because two vowel keys 28a, 28b are used, fewer key taps are necessary to input a vowel. For example, entry of an "e" requires 1 tap, entry of an "a" requires 2 taps, entry of an "i" requires 1 tap, entry of an "o" requires 2 taps, and entry of a "u" requires 3 taps.

The key arrangement of FIG. 3 includes a # key 44 for switching between alphabetic and numeric characters. A shift key 50 can be used for producing capital letters. The space function key 34 is positioned below the 2×3 array 22 in the same row 32 as the vowel keys 28a, 28b, but is positioned to the right side of the vowel keys. Communication keys 36 associated with the fourth set of keys are positioned in a row 58 above the 2×3 array 22 of keys and include a send key 38, an end key 40, and a question mark key 42. The question mark is meant to show that the key 42 can be used for any desired function. The question mark key 42 may be programmable to allow the user to select the function associated with the key 42.

Figure 4:
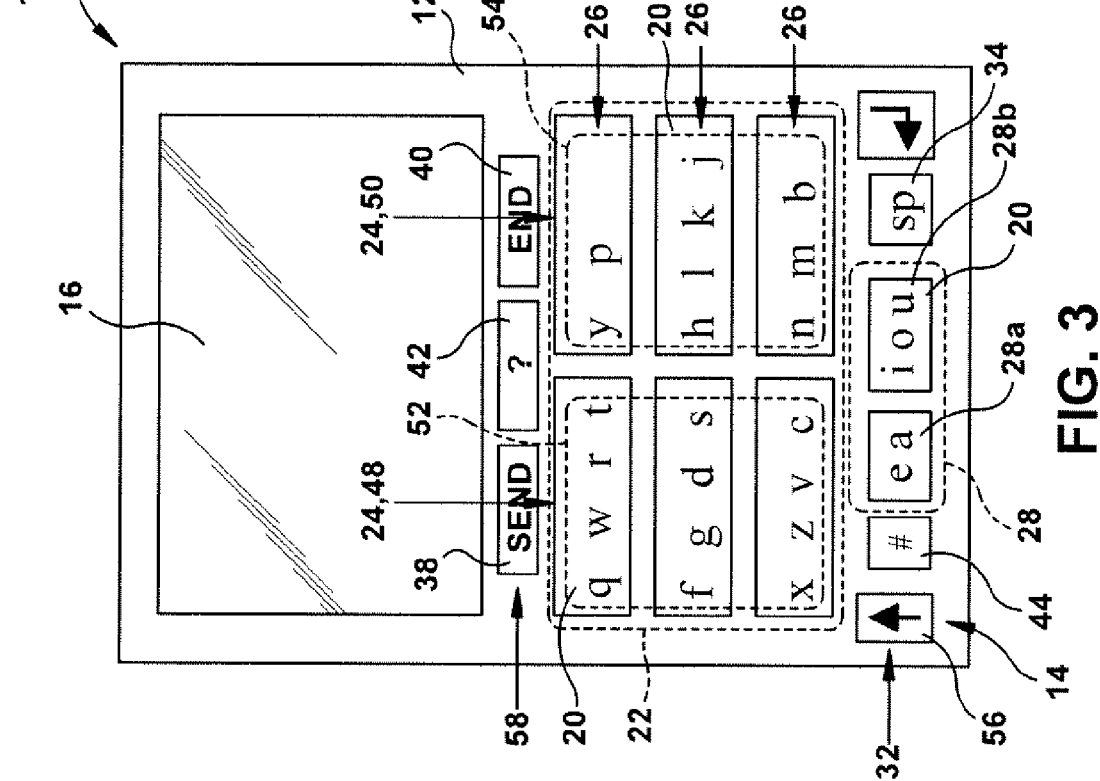
FIG. 4 is a front plan schematic of a handheld communication device incorporating a fourth example keyboard.

FIG. 4 depicts an alternative example keyboard 14 having a 2×3 array 22 of consonants and two vowel keys 28a, 28b positioned below the 2×3 array 22, like that discussed above in connection with FIG. 3. FIG. 4 also includes the feature of word completion. Word completion is a software module that completes the ending of a word based upon letters that have already been selected. For example, if the following is entered "hel," the word completion programming will bring up a list of words like "hell," "hello," "help," and "helm." The user then may select one of the words using the navigation buttons 60 that are depicted on the left side of the mobile device 10. Further typing of the characters associated with a word will provide a refined list of words on the replacement list. Word completion is not the same as predictive text. Predictive text guesses a list of characters based upon what the user has already typed. Word completion takes what has been typed and completes the word with all words having the same root. The navigation buttons 60 are up and down arrows. With word completion, as a user types the beginning part of a word, a list of words will appear on the display screen. The user may select one of the words using the navigation buttons, which may also have a "selection function" in addition to a navigation function. The selection function may be a long press or other input. Alternatively, another key or button, like a thumbwheel, could be pressed to select the desired word from the list. Other techniques, as known by those of skill in the art, may also be used.

FIG. 5 is like FIG. 4, but shows the navigation buttons 60 positioned at a different location from those shown in FIG. 4. The navigation buttons 60 may be positioned at any location on the housing 12 of the mobile device 10. In addition, instead of navigation buttons, a thumbwheel 234 or other similar selection device may be utilized in addition to or instead of the navigation buttons 60 shown.

FIGS. 6 and 7 depict several possible numeric arrangements for the keyboard 14 of FIGS. 1-5. In FIG. 6, each key in the 2×3 array 22 has two numbers, with the exception of the "0" key, which includes a "*." The "#" key 44 is used to switch modes between alphabetic characters and numeric characters. FIG. 6 shows the "#" key 44 being highlighted so that the user is aware that the mobile device is in numeric mode. The "#" key 44 may be highlighted using back lighting, if desired. In FIG. 7, the numbers are arranged on the keys in a more traditional phone pad layout, with "1, 2, 3" being positioned in a top row, "4, 5, 6" being positioned in a center row, "7, 8, 9" being positioned in a row below the center row, and "0" positioned in the bottom-most row 32. The "0" key is centered beneath the remainder of the number keys in order to mimic a telephone keypad. Other arrangements for the numbers may also be utilized, the invention not being limited to a particular arrangement of number keys.

Figure 9:
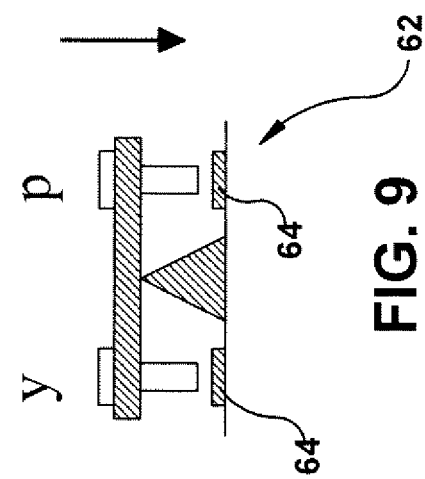
FIG. 9 is a side schematic view of a toggle switch for use with the example keyboards.

FIG. 8 represents a different example keyboard 14. In this example, toggle keys 62 are used in order to avoid having to tap a key up to five times in order to input a desired character. FIG. 9 depicts a possible hardware configuration for a toggle key 62. In FIG. 8, the alphabetic indicia associated with each key 62 is split on the key between a left side and a right side. This is a visual cue to the user that will assist the user in recognizing that they need to press one side or the other of the key 62 to select a particular character. A switch 64 is associated with each end of the toggle key and can be any type of switch 64. The toggle key 62 of FIG. 9 has a separate switch 64 positioned below each end of the key 62. When a user presses the left side of the key, the left switch is activated and when a user presses the right side of the key, the right switch is activated.

The use of the toggle key 62 allows the user to multi-tap and toggle values on both ends of the key 62, which results in fewer key presses by a user in order to select a character. Taking the top row of the QWERTY key arrangement in FIG. 8, the user would input characters in a manner consistent with the description in Table 1 below.

TABLE 1

| Letter | Key | Switch Side | No. of Taps |
|--------|-----|-------------|-------------|
| Q | QWRT (key 1) | Left | 1 |
| W | QWRT (key 1) | Left | 2 |
| R | QWRT (key 1) | Right | 1 |
| T | QWRT (key 1) | Right | 2 |
| Y | YP (key 2) | Left | 1 |
| P | YP (key 2) | Right | 2 |
| I | IOU (key 8) | Left | 1 |
| O | IOU (key 8) | Left or Right | 2 |
| U | IOU (key 8) | Left | 1 |

Numbers may also be selected using a toggle key 62. For example, referring to FIG. 6, to toggle a "1," the user taps the left side of key 66 once. To toggle a "2," the user taps the right side of key 66 once.

Advantageously, the keyboard 14 of FIG. 8 can dramatically reduce the number of necessary key strokes relative to the key strokes necessary with the prior figures, making the reduced keyboard efficient to operate. Word completion, as discussed above, can also be used in connection with the toggle key 62.

Figure 10:
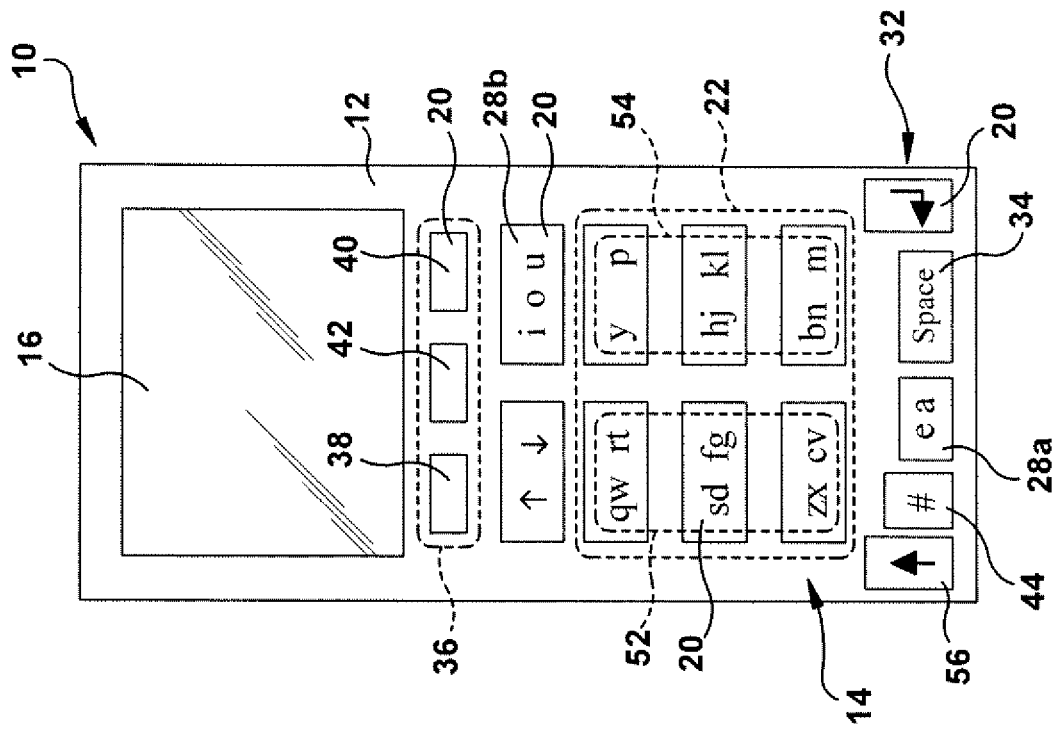
FIG. 10 is a front plan schematic of a handheld communication device incorporating an eighth example keyboard.
Figure 11:
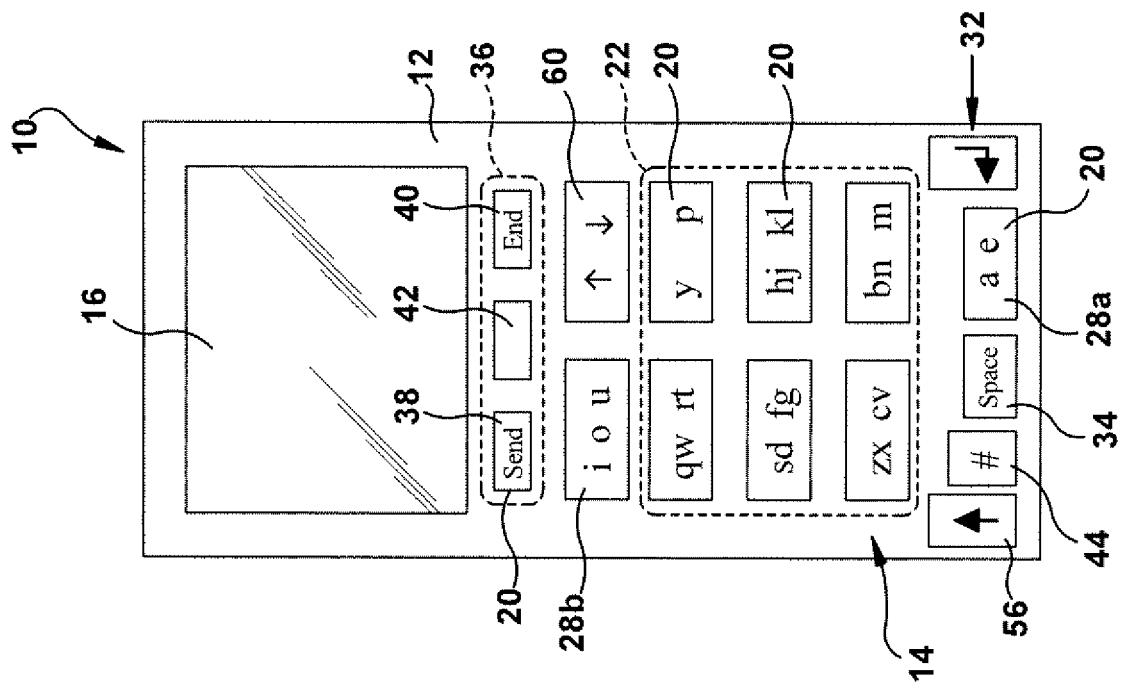
FIG. 11 is a front plan schematic of a handheld communication device incorporating a ninth example keyboard.
Figure 12:
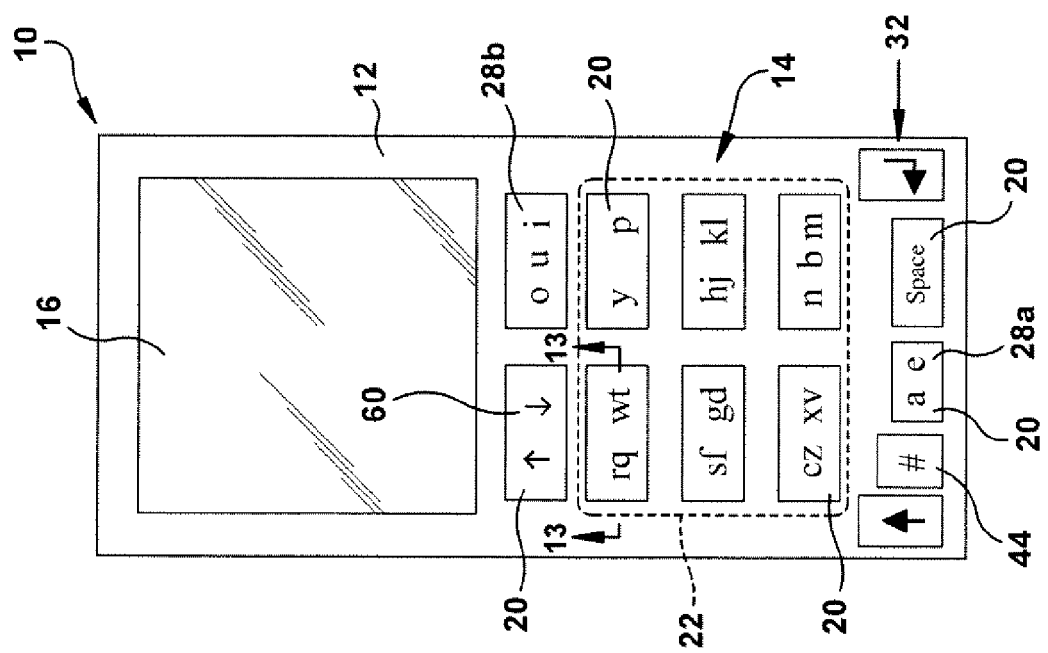
FIG. 12 is a front plan schematic of a handheld communication device incorporating a tenth example keyboard.

FIGS. 10 to 12 depict alternative example keyboards that utilize a reduced 2×3 array 22 of consonants with two separate vowel keys 28a, 28b. In these examples, the vowel keys 28a, 28b are positioned one above and one below the 2×3 array of consonants 22. In FIG. 10, the vowel keys 28a, 28b are split between "e, a" 28a and "i, o, u," 28b with the "e, a" being positioned below the 2×3 array 22 and the "i, o, u" being positioned above and to the right of the 2×3 array 22. In this example, the consonants are arranged in a standard QWERTY format on toggle keys 62. Non-toggle keys could also be used, if desired. The user taps once to select the outermost letter and twice to select the inner letter on each side of the toggle.

FIG. 11 is similar to FIG. 10, but includes an "a, e" key 28a positioned below and to the right of the 2×3 array 22 and an "i, o, u" key 28b positioned above and to the left side of the 2×3 array 22. FIGS. 10 and 11 also include navigation keys 60 positioned above the 2×3 array of keys 22. In FIG. 10, the navigation keys 60 are to the upper left of the 2×3 array 22 and in FIG. 1l, the navigation keys 60 are to the upper right of the 2×3 array 22.

Figure 13:
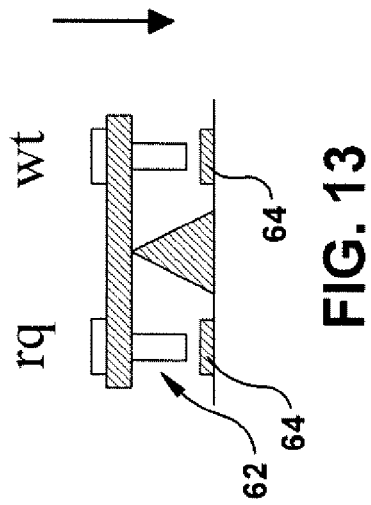
FIG. 13 is a side schematic view of a toggle switch for use with the example keyboards.

FIGS. 12 and 13 are similar to FIGS. 10 and 11, but depict the consonants arranged based upon frequency of usage. The more frequently used letters, according to the percentages listed in FIG. 14, are arranged on the outer ends of toggle key 62 and can be accessed with a single tap, and the less frequently used letters are arranged on the inner part of the toggle key 62 and can be accessed with a double tap. The consonants still maintain their left side/right side characteristics, as discussed above, in order to aid in user familiarity, but they are not positioned in the QWERTY order that was used in FIGS. 10 and 11. If desired, the vowels could be integrated into the 2×3 array 22, as with FIG. 1, and arranged in order on the toggle keys 62 based upon frequency of usage.

Word completion may also be used with any of the examples discussed above, if desired. The navigation keys 60 are shown in FIG. 12 being positioned above and to the left side of the 2×3 array 22, and an example toggle key 62 is shown in FIG. 13.

Any of the example keyboards 14 may use multi-tap, toggle, word completion, or a combination thereof. Each of the above examples maintains, to some degree the familiar QWERTY keyboard layout on a reduced keyboard. At minimum the left side and right side keys of the QWERTY keyboard maintain their position in the left column or right column of the 2×3 array 22. In other instances, the consonants maintain their QWERTY order on the keys 20, remaining split between left side and right side so that the user's left hand will always be associated with left side consonants and the user's right hand will always be associated with right side consonants.

FIG. 15 is an exploded view of the hardware of a mobile communication device 10 incorporating an example keyboard 14. The device 10 includes a first device housing section 260 and a second device housing section 262. The housing sections are connected together with fasteners (not shown) that engage a plurality of holes 250, 254 to form a single integrated device housing 12 that encloses the internal components of the mobile communication device 10. The fasteners may be screws, rivets or the like. Fasteners are but one example of possible components that may be used to couple the device housing sections together. Other components include flexible or rigid but deformable members, possibly integral with one of the device housing sections, which engage cooperating structures on the other or each device housing section or are deformed to hold the device housing sections together. The device housing sections might also or instead be coupled together by bonding, with adhesive, for example. However, the device housing sections are preferably coupled together using releasable fasteners such as screws.

The device 10 depicted in FIG. 15 includes a PCB (printed circuit board) 264. Most of the internal components of the mobile communication device 10 are preferably mounted on the PCB 264. The keyboard 14 is preferably formed by positioning a key web 233A over a plurality of switches 233B on the PCB 264. The key web 233A and plurality of switches 233B are preferably configured such that each key 20 in the key web 233A contacts and operates one of the switches 233B when the key 20 is depressed. Other configurations may also be implemented, in which the number of switches 233B may be less than the number of keys 20 on the key web 233A, or the number of switches 233B may be greater than the number of keys 20 on the key web 233A. The key web 233A and switches 233B are also positioned such that the apertures 235 on the first device housing section 260 at least partially expose the keyboard 14. Portions of the key web 233A are exposed by the apertures 235 to provide key 20 surfaces that may be depressed by a user to provide data input to the device 10. Such data input may, for example, be used to generate data communications on the device 10.

A display 16 is preferably mounted on the PCB 264. When the first device housing section 260 and second device housing section 262 are coupled together, an aperture 223 in the first device housing section 260 at least partially exposes the display 16. The aperture 223 in the first device housing section 260 and the display 16 on the PCB 264 may be positioned such that a viewing area 225 of the display 16 is exposed. The frame and other components associated with the display 16 are preferably hidden from view when the first and second device housing sections 260, 262 are coupled together.

A speaker 234 is preferably mounted at or near the top of the PCB 264. One or more apertures 235 in the first device housing section 260 are positioned to at least partially expose the speaker 234 when the first and second device housing sections 260, 262 are coupled together. A microphone 236 is mounted in the second device housing section 262. The microphone 236 is at least partially exposed by the aperture 237B in the second device housing section, and coupled to the PCB and other device components. Audio or voice inputs to the microphone 236 may be used, for example, to generate voice communications. When the microphone 236 is positioned in the housing 12, an aperture (not shown) is provided in the first device housing section 260 to at least partially expose the microphone 236. The microphone 236 may alternatively be mounted in the first device housing section 260 or on the PCB 264.

The device housing sections 260, 262 may include further apertures to expose or partially expose other device components. In the first device housing section 260, apertures 270, 272 and 274 are configured to partially expose the auxiliary I/O devices. An aperture 268 is similarly positioned in the second device housing section 262 to at least partially expose an auxiliary I/O device 228D. An aperture 266 in the second device housing section 262 may be provided to accommodate a power supply such as a battery. Other apertures may also be provided in the device housing 12, as necessary.

Other internal components of the device 10 may also be mounted on the PCB 264. The device components are interconnected to provide at least data and voice communication functionality, possibly in addition to further local non-communication functions and short-range communication functions. Although these other internal components are not shown in FIG. 15, most of them are preferably mounted on the rear side of the PCB 264, opposite the side on which the keyboard 14, display 16 and speaker 234 are mounted, but some components may be mounted adjacent to the display 16 and/or keyboard 14 or on or along an edge of the PCB 264. The internal components of the device 10 are interconnected as necessary, through wired connections, PCB tracks, other types of connectors or connections, or combinations thereof.

The first and second device housing sections 260, 262, when coupled together, form a handheld mobile communication device housing 12 enclosing the PCB 264 and internal components. The apertures 235, 223, 235 and 237B at least partially expose the speaker 234, display 16, keyboard 14 and microphone 236 as described above. Partial exposure of these components allows a user to make use of these components while at the same time protecting the components from damage. Apertures 268, 270, 272, 274 similarly expose and protect auxiliary I/O devices. When access to a component will normally be required relatively infrequently, a removable cover element may be provided for a corresponding device housing aperture. In the above example of a device power supply, a cover (not shown) is preferably provided for the aperture 266. Access to the power supply is possible when required, but the battery remains protected when access is not necessary.

The mobile communication device 10 may also include a predictive text computer program that is used in conjunction with the keyboard. Predictive test software is useful in reduced format keyboards, such as the example keyboard, in order to identify the desired input from the combination of keys strokes of a user. A predictive text computer program may, for example, be used to predict a complete word or phrase from one or more keystrokes. If the predictive text computer program does not successfully predict a desired word or phrase, then text-entry characters may be entered more precisely, albeit more slowly, by selecting the appropriate characters on the keys 20. An example predictive text computer program is described in the following co-owned patent applications, which are incorporated herein by reference in their entirety: "Customizable Predictive Text Method For Reduced Keypads," U.S. Provisional Patent Application No. 60/397,680, filed Jul. 23, 2002; "Systems and Methods of Building and Using Custom Word Lists," International Patent Application No. PCT/CA03/01103, filed Jul. 23, 2003, and "Portable Electronic Device With Keypad", International Patent Application No. PCT/CA02/00862, filed Jun. 10, 2002.

Figure 16:
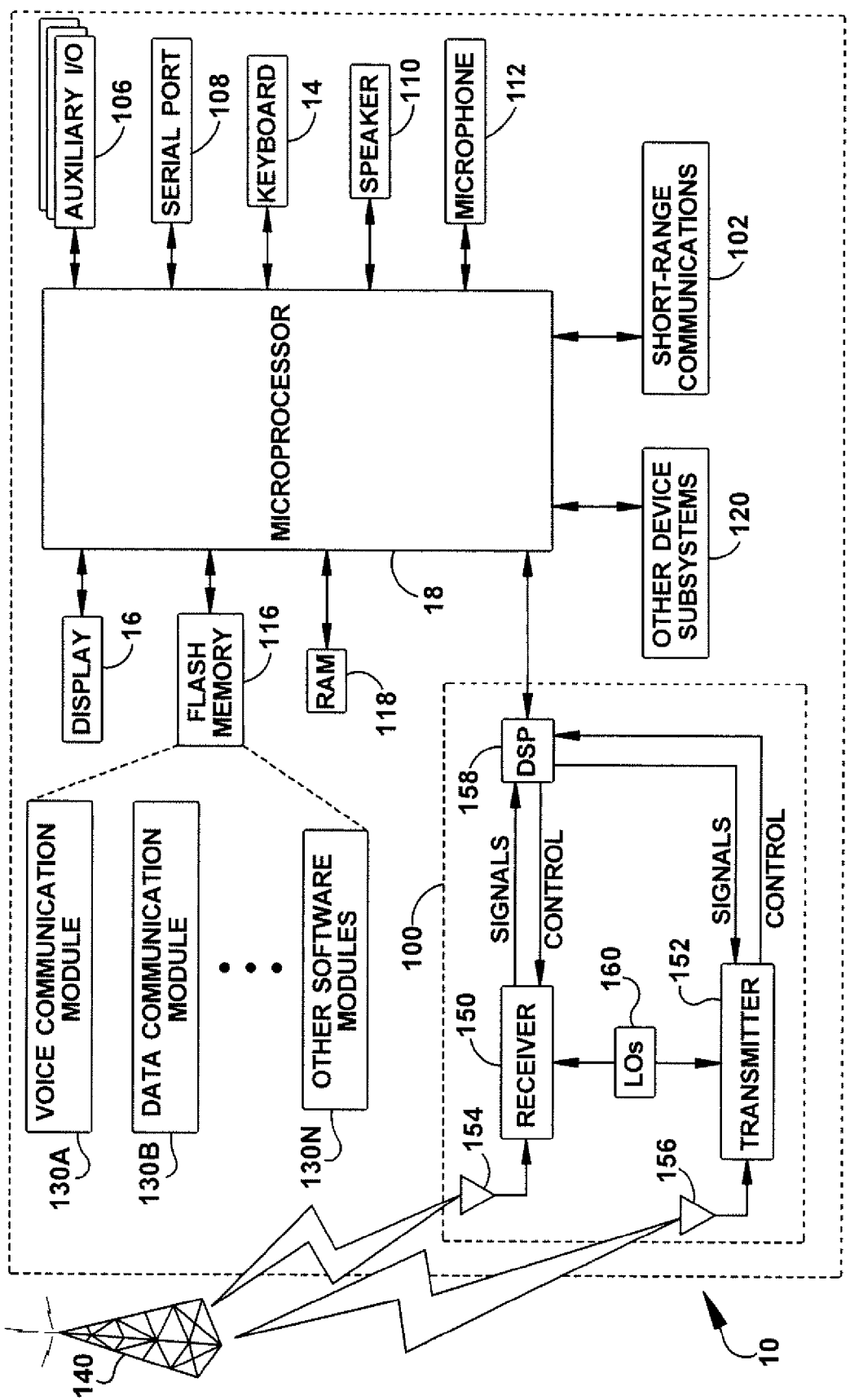
FIG. 16 is a block diagram illustrating the subsystems of interest in the mobile communication device.

The mobile communication devices 10 that may be utilized with the example keys 20 typically include a housing 12, a keyboard 14 and an output device 16. An example of a mobile device 10 is shown in FIG. 15. The output device shown is a display 16, which is preferably a full graphic LCD. Other types of output devices may alternatively be utilized. A processing device 18, which is shown schematically in FIG. 16, is contained within the housing 12 and is coupled between the physical keyboard 14 and the display 16. The processing device 18 controls the operation of the display 16, as well as the overall operation of the mobile communication device 10, in response to actuation of keys 20 on the keyboard 14 by the user.

The housing 12 may be elongated vertically, or may take on other sizes and shapes, including a clamshell housing structure, among other structures. The keyboard may include a mode selection key, or other hardware or software for switching between text entry and telephony entry. Other shapes and sizes for the keyboard may be utilized.

In addition to the processing device 18, other parts of the mobile communication device 10 are shown schematically in FIG. 16. These include a communications subsystem 100; a short-range communications subsystem; the keyboard 14 and the display 16, along with other input/output devices 106, 108, 110 and 112; memory devices 116, 118; and various other device subsystems 120. The mobile communication device 10 is preferably a two-way RF communication device having voice and data communication capabilities. In addition, the mobile device 10 preferably has the capability to communicate with other computer systems via the Internet.

Operating system software executed by the processing device 18 is preferably stored in a persistent store, such as a flash memory I 16, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile communication device may also be stored to the RAM 118.

The processing device 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application and incorporated herein by reference.

Communication functions, including data and voice communications, are performed through the communication subsystem 100, and possibly through the short-range communications subsystem. The communication subsystem 100 includes a receiver 150, a transmitter 152, and one or more antennas 154, 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile communication device 10 is intended to operate. For example, a mobile communication device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 18. The received signal is then further processed by the processing device 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile communication device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

The keys 20 shown are rectangular or oval shaped, but may be any variety of shapes, including round, rectangular, oval, square, triangular, irregular, or otherwise. Other shapes and sizes may also be utilized, without limitation.

While the above description and drawings show a physical keyboard having keys that are pressed, most if not all of the examples discussed above may alternatively be used with a touch screen or depressible touch screen type of keyboard. The examples are not strictly limited to usage on a physical keyboard. With a touch screen type of keyboard, the screens may be automatically reconfigured from alphabetic to numeric and vice versa utilizing software and programming internal to the mobile device. Other types of keyboard displays may alternatively be provided, such as function or symbol displays, if desired.

In one example, a keyboard for a mobile device comprises a plurality of keys arranged in a plurality of columns and a plurality of rows. The plurality of keys includes a first set of keys and a third set of keys. The first set of keys is associated with alphabetic characters comprising at least consonants of the alphabet and is arranged in an array of 3 rows by 2 columns. The third set of keys is associated with one or more functions or symbols. The third set of keys is not positioned in rows in which the first set of keys is located.

The first set of keys may be associated with consonants and vowels A-Z and numbers 0-9. The consonants and vowels may be arranged in the format of a QWERTY key arrangement. The first row may be associated with QWERTYUIOP. The second row may be associated with ASDFGHJKL. The third row may be associated with ZXCVBNM. Each row may be split into a first half of the respective QWERTY row and a second half of the respective QWERTY row, with the first and second halves being the same as those keys associated with the left and right hands of a user during customary typing use of a QWERTY key arrangement.

In one example, the alphabetic characters may be ordered on each key in the order of a QWERTY key arrangement, or ordered based upon a predetermined frequency of usage. The predetermined frequency of usage may be derived from modern prose. When the alphabetic characters are ordered based upon the frequency of usage, the alphabetic characters having the highest frequency are positioned at a left-most position on the respective key and the alphabetic characters having the lowest frequency are positioned at a right-most position on the respective key.

The first set of keys may be toggle keys or non-toggle keys. When the first set of keys are toggle keys, they have a left side switch and a right side switch. The respective alphabetic characters are organized on each key based upon frequency of usage such that at least two of the characters have a higher frequency than the other characters. One of the higher frequency characters may be associated with the left side switch and the other of the higher frequency characters may be associated with the right side switch. Indicia identifying the alphabetic characters may be positioned on the first set of keys and arranged in a horizontal line, with higher frequency of usage characters being positioned on the respective outer ends of the horizontal lines of indicia.

In another example keyboard, at least one vowel key is associated with vowels and the vowel key is positioned in a row other than the rows of the first set of keys. The at least one vowel key may be a single key having all the vowels associated therewith, with the vowel key being positioned in a row below the first set of keys. The at least one vowel key may be positioned in a row with at least some of the third set of keys. The vowel key may be positioned between keys of the third set of keys. Indicia identifying the associated vowels on the at least one vowel key may be arranged in an order on the vowel key corresponding with the order of E, A, O, I, U; or E, U, to, A; or E, A, I, O, U; or A, E, O, U, I.

The at least one vowel key may comprise a first and a second vowel key. The first and second vowel keys may be positioned in a row other than the rows of the first set of keys. The first vowel key may be positioned in a row below the first set of keys and the second vowel key may be positioned in a row above the first set of keys. Alternatively, the first and second vowel keys may be positioned in the same row below the first set of keys.

In one example, the first vowel key is associated with indicia indicating the vowels that are associated with the first vowel key. The indicia is arranged on the key as "E, A." The second vowel key is associated with indicia indicating the vowels that are associated with the second vowel key and the indicia is arranged on the key as "I, O, U." Alternatively, the indicia of the first vowel key is arranged on the key as "A, B," and the indicia of the second vowel key is arranged on the key as "O, U, I."

The first vowel key may be positioned in a row with the third set of keys. The third set of keys may include at least a shift key, a space key, and a return key.

In another example keyboard, a physical keyboard for a mobile device comprises a plurality of physical keys arranged in a grid pattern that comprises rows and columns. The plurality of physical keys comprises a first set of alphanumeric characters arranged in a two column by three row array of keys. The first column of the first set is associated with letters from the left side of a QWERTY keyboard and the second column of the first set is associated with letters from the right side of a QWERTY keyboard. The left side of the QWERTY keyboard corresponds to those keys normally input by a user with a left hand and the right side of the QWERTY keyboard corresponds to keys normally input by a user with a right hand.

The two column by three row array of keys may be associated with at least consonants and vowels. The keyboard may further comprise a fourth row that includes at least function keys. The alphanumeric characters that are associated with the two column by three row array of keys may be consonants and numbers, and the keyboard may further comprise a third set of keys positioned in a fourth row having keys associated with at least functions and vowels. The third set of keys may include at least one key associated with vowels, and the fourth row may be positioned one of above or below the two by three array of keys. The keyboard may further comprise a fourth set of keys associated with communication functions positioned above the two by three array of keys. The communication functions include at least send and end.

The keys and keyboard may be configured to input alphanumeric characters using a multi-tap input technique. Each key in the first set of keys may be coupled to a toggle switch and each toggle switch may be configured to input alphanumeric characters using a toggle input. The keyboard may further comprise an alphanumeric shift key for toggling between alphabetic characters and numeric characters. The keys and keyboard may be configured to input alphanumeric characters using a multi-tap input technique that is based upon a predetermined frequency of usage, or using a multi-tap input technique that features word completion, or using a multi-tap input technique that is based upon a predetermined frequency of usage that features word completion.

In the example keyboard, indicia associated with the alphanumeric characters may be identified on a face of each corresponding key. The indicia may be organized based upon the predetermined frequency of usage.

In a further example, a keyboard for a mobile device comprises a plurality of keys arranged in a grid pattern that includes rows and columns. The plurality of keys comprises a first set of keys arranged in a two column by three row array and a second set of keys positioned in a row that does not overlap that of the first set of keys. The first set is associated with consonants. The second set of keys is associated with vowels.

The second set of keys may be positioned in a fourth row that is located either above or below the first set of keys. The second set of keys may comprise two keys, with one of the keys being positioned below the first set of keys and one of the keys being positioned above the first set of keys. The second set of keys may comprise a single vowel key that is positioned below the first set of keys. The second set of keys may be positioned in a fourth row below the first set of keys. And the keyboard may further comprise a third set of keys that comprises functions. At least one of the third set of keys may share a row with at least one of the second set of keys. The keyboard may further comprise a fourth set of keys that comprises communication functions. The fourth set of keys is positioned in a row other than the row in which the first set of keys is positioned.

The keys in the first set of keys may be toggle keys. Each of the keys in the first set of keys, second set of keys, and third set of keys may be toggle keys.

The consonants associated with the first set of keys are selected via a multi-tap input technique. The consonants and vowels may be input via a multi-tap technique that is based upon frequency of usage. The second set of keys may comprise two keys, with some of the vowels being associated with a first key and some of the vowels being associated with a second key. The consonants and vowels may be input via a multi-tap technique that includes word completion programming.

In yet another example, a keyboard for a mobile device comprises a plurality of keys arranged in a grid that comprises three rows and two columns. The plurality of keys is associated with letters A-Z. Indicia corresponding to the letters is associated with the surface of each key in the format of a QWERTY keyboard arrangement. The letters are arranged in an order on the respective keys based upon a preselected frequency of usage.

The term "substantially," if used herein, is a term of estimation.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A keyboard for a mobile device comprising:
    a plurality of keys arranged in a plurality of columns and a plurality of rows including:
    a first set of keys associated with alphabetic characters comprising at least consonants of the alphabet and arranged in an array of 3 rows by 2 columns; and
    an additional set of keys associated with one or more functions or symbols,
    wherein the additional set of keys is not positioned in rows in which the first set of keys is located;
    wherein the alphabetic characters are ordered on each key based upon a predetermined frequency of usage;
    wherein the first set of keys are toggle keys having a left side switch and a right side switch, and the respective alphabetic characters are organized on each key based upon frequency of usage such that, on each key with more than two characters, at least two of the characters have a higher predetermined frequency than the other characters, with one of the higher frequency characters being associated with the left side switch and the other of the higher frequency characters being associated with the right side switch;
    wherein indicia identifying the alphabetic characters is positioned on the first set of keys and arranged in a horizontal line, with higher frequency of usage characters being positioned on the respective outer ends of the horizontal lines of indicia.

2. A keyboard for a mobile device comprising:
    keys arranged in columns and rows including:
    a first set of keys associated with only numeric and alphabetic characters including the consonants of the alphabet, with the first set of keys arranged in an array of 3 rows by 2 columns; and
    an additional set of keys associated with one or more functions or symbols other than alphabetic characters;
    wherein the additional set of keys is not positioned in rows in which the first set of keys is located;
    wherein the alphabetic characters are ordered on each key based upon a predetermined frequency of usage; and
    wherein the first set of keys are toggle keys having a left side switch and a right side switch, including toggle keys with more than two characters, and the respective alphabetic characters are organized on each key based upon the predetermined frequency of usage such that, on each key with more than two characters, at least two of the characters have a higher predetermined frequency than the other characters, with one of the higher frequency characters being associated with the left side switch and the other of the higher frequency characters being associated with the right side switch;
    wherein indicia identifying the alphabetic characters is positioned on the first set of keys and arranged in a horizontal line, with higher frequency of usage characters being positioned on the respective outer ends of the horizontal lines of indicia.

3. The keyboard of claim 1, wherein the higher frequency character associated with the left side switch is selected with a single press of the left side switch, the higher frequency character associated with the right side switch is selected with a single press of the right side switch, and one or more other characters having a lesser predetermined frequency are selected with multiple presses of the left or right side switch.

4. The keyboard of claim 1, further comprising at least one vowel key, the vowel key being associated with vowels, wherein the at least one vowel key is positioned in a row other than the rows of the first set of keys.

5. The keyboard of claim 4, wherein the at least one vowel key is a single key having all the vowels associated therewith, with the vowel key being positioned in a row below the first set of keys.

6. The keyboard of claim 5, wherein the at least one vowel key is positioned in a row with at least some of the additional set of keys.

7. The keyboard of claim 5, wherein the vowel key is positioned between keys of the additional set of keys.

8. The keyboard of claim 4, wherein indicia identifying the associated vowels on the at least one vowel key is arranged in an order on the vowel key corresponding with the order of E, A, O, I, U; or E, U, I, O, A; or E, A, I, O, U; or A, E, O, U, I.

9. The keyboard of claim 4, wherein the at least one vowel key comprises a first and a second vowel key, said first and second vowel keys being positioned in a row other than the rows of the first set of keys.

10. The keyboard of claim 9, wherein the first vowel key is positioned in a row below the first set of keys and the second vowel key is positioned in a row above the first set of keys; or the first and second vowel keys are positioned in the same row below the first set of keys.

11. The keyboard of claim 10, wherein the first vowel key is associated with indicia indicating the vowels that are associated with the first vowel key, and the indicia is arranged on the key as "E, A", and the second vowel key is associated with indicia indicating the vowels that are associated with the second vowel key and the indicia is arranged on the key as I, O, U; or the indicia of the first vowel key is arranged on the key as "A, E," and the indicia of the second vowel key is arranged on the key as "O, U, I."

12. The keyboard of claim 10, wherein the first vowel key is positioned in a row with the additional set of keys, and the additional set of keys includes at least a shift key, a space key, and a return key.

13. The keyboard of claim 2, wherein the higher frequency character associated with the left side switch is selected with a single press of the left side switch, the higher frequency character associated with the right side switch is selected with a single press of the right side switch, and one or more other characters having a lesser predetermined frequency are selected with multiple presses of the left or right side switch.

14. The keyboard of claim 2, wherein the first set of keys is associated with only consonants and numbers 0-9.

15. The keyboard of claim 2, further comprising at least one vowel key, the vowel key being associated with vowels, wherein the at least one vowel key is positioned in a row other than the rows of the first set of keys.

16. The keyboard of claim 15, wherein the at least one vowel key is a single key having all the vowels associated therewith, with the vowel key being positioned in a row below the first set of keys.

17. The keyboard of claim 16, wherein the at least one vowel key is positioned in a row with at least some of the additional set of keys.

18. The keyboard of claim 16, wherein the vowel key is positioned between keys of the additional set of keys.

19. The keyboard of claim 15, wherein indicia identifying the associated vowels on the at least one vowel key is arranged in an order on the vowel key corresponding with the order of E, A, O, I, U; or E, U, I, O, A; or E, A, I, O, U; or A, E, O, U, I.

20. The keyboard of claim 15, wherein the at least one vowel key comprises a first and a second vowel key, said first and second vowel keys being positioned in a row other than the rows of the first set of keys.

21. The keyboard of claim 20, wherein the first vowel key is positioned in a row below the first set of keys and the second vowel key is positioned in a row above the first set of keys; or the first and second vowel keys are positioned in the same row below the first set of keys.

22. The keyboard of claim 21, wherein the first vowel key is associated with indicia indicating the vowels that are associated with the first vowel key, and the indicia is arranged on the key as "E, A", and the second vowel key is associated with indicia indicating the vowels that are associated with the second vowel key and the indicia is arranged on the key as I, O, U; or the indicia of the first vowel key is arranged on the key as "A, E," and the indicia of the second vowel key is arranged on the key as "O, U, I."

23. The keyboard of claim 21, wherein the first vowel key is positioned in a row with the additional set of keys, and the additional set of keys includes at least a shift key, a space key, and a return key.

* * * * *